United States Patent
Levy

(10) Patent No.: US 7,233,971 B1
(45) Date of Patent: Jun. 19, 2007

(54) SYSTEM AND METHOD FOR ANALYZING WORK ACTIVITY AND VALUING HUMAN CAPITAL

(75) Inventor: Robert A. Levy, Pawtucket, RI (US)

(73) Assignee: Levy & Associates, Inc., Providence, RI (US)

( * ) Notice: Subject to any disclaimer, the term of this patent is extended or adjusted under 35 U.S.C. 154(b) by 0 days.

(21) Appl. No.: 09/580,591

(22) Filed: May 26, 2000

(51) Int. Cl.
*G06F 15/16* (2006.01)

(52) U.S. Cl. .......................... 709/203; 705/11; 705/32

(58) Field of Classification Search ............... 709/101, 709/201, 203, 217; 707/7, 11, 102; 705/10, 705/11, 3, 32
See application file for complete search history.

(56) References Cited

U.S. PATENT DOCUMENTS

| | | | | |
|---|---|---|---|---|
| 5,111,391 A * | 5/1992 | Fields et al. ................. | 705/9 |
| 5,164,897 A | 11/1992 | Clark et al. ................. | 364/401 |
| 5,197,004 A | 3/1993 | Sobotka et al. ............. | 364/419 |
| 5,208,762 A * | 5/1993 | Charhut et al. ............. | 700/216 |
| 5,414,621 A | 5/1995 | Hough ....................... | 364/401 |
| 5,546,564 A | 8/1996 | Horie ........................ | 395/500 |
| 5,619,695 A * | 4/1997 | Arbabi et al. .............. | 718/100 |
| 5,680,305 A | 10/1997 | Apgar, IV ................. | 364/401 R |
| 5,819,092 A | 10/1998 | Ferguson et al. ........... | 395/701 |
| 5,884,270 A | 3/1999 | Walker et al. .............. | 705/1 |
| 5,890,134 A * | 3/1999 | Fox ........................... | 705/9 |
| 5,911,131 A | 6/1999 | Vig ............................ | 705/1 |
| 5,943,652 A * | 8/1999 | Sisley et al. ............... | 705/9 |
| 5,960,407 A | 9/1999 | Vivona ....................... | 705/10 |
| 5,963,914 A * | 10/1999 | Skinner et al. |
| 5,978,767 A | 11/1999 | Chriest et al. .............. | 705/1 |
| 5,978,768 A | 11/1999 | McGovern et al. ......... | 705/1 |
| 6,005,932 A * | 12/1999 | Bloom |
| 6,249,715 B1 * | 6/2001 | Yuri et al. .................. | 700/111 |
| 6,256,967 B1 * | 7/2001 | Hebron et al. .............. | 53/501 |
| 6,275,570 B1 * | 8/2001 | Homan et al. |
| 6,282,531 B1 * | 8/2001 | Haughton et al. .......... | 706/50 |
| 6,289,340 B1 * | 9/2001 | Puram et al. ............... | 707/5 |
| 6,321,205 B1 * | 11/2001 | Eder .......................... | 705/7 |
| 6,338,042 B1 * | 1/2002 | Paizis ........................ | 705/11 |
| 6,347,306 B1 * | 2/2002 | Swart ........................ | 705/32 |
| 6,356,875 B1 * | 3/2002 | Green et al. ................ | 705/9 |
| 6,411,936 B1 * | 6/2002 | Sanders ..................... | 705/10 |
| 6,453,346 B1 * | 9/2002 | Garg et al. |
| 6,498,920 B1 * | 12/2002 | Simon |
| 6,513,019 B2 * | 1/2003 | Lewis ........................ | 705/35 |
| 6,587,832 B1 * | 7/2003 | Beck et al. ................. | 705/9 |
| 7,149,700 B1 * | 12/2006 | Munoz et al. .............. | 705/8 |

\* cited by examiner

*Primary Examiner*—Saleh Najjar
*Assistant Examiner*—Michael Won
(74) *Attorney, Agent, or Firm*—Kirkpatrick & Lockhart Preston Gates Ellis LLP

(57) ABSTRACT

A system and method for obtaining information about the work activities of an employee includes providing a site accessible to the employee over a network, creating a profile of the work activities of the employee at the site, and calculating a value for the profile of the work activities of the employee or analyzing the work activities in the profile. Analyses may be performed and a report may be generated based on the work activities of the employee in the profile and the calculated value for the profile. The system may be implemented over the network with a server and a computer.

35 Claims, 11 Drawing Sheets

300

Is your personal information correct?

| Employee Information | |
|---|---|
| First Name | John |
| MI | H |
| Last Name | Jones |
| Employee Number | 2179 |
| Sex | Male |
| Date of Birth | 03/31/1982 MM/DD/YYYY |

| Job Information | |
|---|---|
| Job Title | A/R- Collections Clerk |
| Location | OH  305 |
| Status | Part Time |
| Hire Date | 04/03/2000 MM/DD/YYYY |
| Hours Worked per Week | 20.0 |
| Manager | TEX, TODD |

| Experience | |
|---|---|
| Degree | Unknown |
| Degree Type | Unknown |
| Experience in Field | Years: 0  Months: 0 |

| Organization Information | |
|---|---|
| Level 1: | AAA Corp |
| Level 2: | ABC Brokerage Co - 1 |
| Level 3: | Administration - 14 |
| Level 4: | Finance - 141 |
| Level 5: | Accounting |

It's time to create your Personal Work Profile

It's easy. All you do is pick from a list.

Creating your Personal Work Profile doesn't require any writing. Pick all your Work Activities from the built-in Directory. The Directory contains hundreds and hundreds of choices, in a searchable database.

To make this task even easier, we've already created hundreds of job templates to help you get you started. You can quickly edit a job template in any way you like, removing or adding Work Activities as you see fit, to tailor the template to you.

If you can't find an appropriate job template, you can create your Personal Work Profile from scratch.

Whenever possible you should choose a job template instead of creating a Personal Work Profile from scratch.

( Show Me The Templates ▶ )

( I'll Create My Personal Profile From Scratch ▶ )

FIG. 7

SYSTEM AND METHOD FOR ANALYZING WORK ACTIVITY AND VALUING HUMAN CAPITAL

TECHNICAL FIELD

The invention relates to a system and method for analyzing work activity, and in particular for evaluating an organization's human resources based on employees' work activity.

BACKGROUND

In organizations such as companies, human resource personnel and managers have the responsibility of writing narrative job descriptions for company employees. The job descriptions are used to determine personnel requirements and allocate personnel within the company. These job descriptions are also used for establishing salary ranges, evaluating personnel, and recruiting employees.

Job descriptions prepared by different human resource personnel and managers may use completely different, inconsistent terms. Variations in job descriptions make it difficult if not impossible to compare different jobs, e.g., in terms of the tasks which the jobs encompass.

Human resource personnel and managers must assign salaries commensurate with the tasks performed by employees holding various positions with the company. Without objective and accurate job descriptions, salary determinations may be subject to bias and inconsistencies.

Human resource personnel and managers also need to prepare strategic personnel reports for evaluating and forecasting personnel requirements. Preparing such reports by hand can be time-consuming and expensive.

SUMMARY

In general, in one aspect, the invention features a system for obtaining information about the work activities of an employee. A server provides a site through which the employee creates a profile of the work activities of the employee. A computer is capable of accessing the site over a network, the employee using the computer to create the profile of the work activities of the employee and transmit the information about the work activities of the employee to the server. The server calculates a value for the profile of the work activities of the employee.

Implementations of the invention may also include one or more of the following features. The server may be capable of performing an analysis of the work activities of the employee based on the profile of the work activities of the employee and the calculated value. The server may be capable of generating a report based on the analysis. The network may be a network known as the Internet.

The system may include a first database including work activity values for work activities of the employee in the profile. The system may also include a second database including a directory of work activities used to create the profile.

The profile may contain a plurality of groups of work activities. The employee may assign a percentage of the employee's time to each group of work activities in the profile. A work activities group value may be calculated for each group of work activities. The work activities group values for the groups of work activities may be weighted to calculate the value for the profile.

In general, in another aspect, the invention features a system for obtaining information about the work activities of a plurality of employees. A server provides a site through which each of the plurality of employees creates a profile of the work activities of the employee. At least one computer is capable of accessing the site over a network, each of the plurality of employees using the computer to create the profile of the work activities of the employee and transmit information about the work activities of the employee to the server. The server performs an analysis of the work activities of the plurality of employees based on the profiles of the work activities of the employees.

In general, in another aspect, the invention features a method of obtaining information about the work activities of an employee. A site accessible over a network is provided. A profile of the work activities of the employee is created at the site. A value for the profile of the work activities of the employee is calculated.

Implementations of the invention may also include one or more of the following features. The method may include generating a report based on the work activities of the employee in the profile and the calculated value for the profile. The method may include adding work activities of the employee to the profile and deleting work activities of the employee from the profile. The method may include providing a template for the employee to create the profile.

The method may include converting the value for the profile to a local geographic equivalent value. The method may include assessing a capability of the employee with respect to the work activities in the profile. The method may include assigning a percentage of the employee's time to the work activities in the profile. The method may also include weighting the working activities of the employee in the profile to calculate the value for the profile.

In general, in another aspect, the invention features a method of obtaining information about the work activities of an employee. A site accessible to the employee over a network is provided. A profile of the work activities of the employee at the site is created. The profile of the work activities of the employee is analyzed.

Implementations of the invention may also include one or more of the following features. The method may include generating a report based on the work activities of the employee in the profile. The method may include adding work activities of the employee to the profile and deleting work activities of the employee from the profile.

The method may include providing a template for the employee to create the profile. The method may include assessing a capability of the employee with respect to the work activities in the profile. The method may also include assigning a percentage of the employee's time to the work activities in the profile.

In general, in another aspect, the invention features an apparatus including a computer-readable medium that stores instructions for implementing an application to obtain information about the work activities of an employee, the instructions for causing a computer to provide a site accessible to the employee over a network, create a profile of the work activities of the employee at the site, and calculate a value for the profile of the work activities of the employee. Implementations of the invention may also include instructions for causing a computer to generate a report based on the work activities of the employee in the profile and the calculated value for the profile.

In general, in another aspect, the invention features a system for implementing an application to obtain information about the work activities of an employee. A memory stores computer instructions. A processor executes the computer instructions to provide a site accessible to the employee over a network, create a profile of the work activities of the employee at the site and calculate a value for the profile of the work activities of the employee. Implementations of the invention may also include instructions to generate a report based on the work activities of the employee in the profile and the calculated value for the profile.

In general, in another aspect, the invention features an apparatus comprising a computer-readable medium that stores instructions for implementing an application to obtain information about the work activities of an employee, the instructions for causing a computer to provide a site accessible to the employee over a network, create a profile of the work activities of the employee at the site, and analyze the profile of the work activities of the employee. Implementations of the invention may also include instructions for causing a computer to generate a report based on the work activities of the employee in the profile.

In general, in another aspect, the invention features a system for implementing an application to obtain information about the work activities of an employee. A memory stores computer instructions. A processor executes the computer instructions to provide a site accessible to the employee over a network, create a profile of the work activities of the employee at the site, and analyze the profile of the work activities of the employee. Implementations of the invention may also include instructions to generate a report based on the work activities of the employee in the profile.

An advantage of the present invention is that it provides a simple system for employees to identify their work activities and estimate the amount of time they devote to specific work activities.

Another advantage of the present invention is that consistent language is used to describe employees' work activities, enabling direct and detailed comparison of work activities.

An additional advantage of the present invention is that employees' work activities may be valued based on actual content A further advantage of the present invention is that on-demand reports reflecting current work activities and employee data may be generated.

The present invention also provides a number of commercial advantages. First, the directory of work activities used in conjunction with the software substantially reduces the time and salary cost required of employees, line managers, and human resources professionals to gather information about the work employees perform. Further, automated job parts pricing methodology substantially reduces the time and salary cost associated with determining competitive salary values for the work performed. In addition, the ability of the system to map work activities across an organization helps to identify opportunities to consolidate work activities, eliminate unnecessary or duplicative jobs, and control salary costs. Moreover, the ability of the system to identify overpaid and underpaid employees helps an organization allocate its employees and salary resources for maximum efficiency and productivity. The system may also be used in a merger or acquisition context to value human capital during due diligence, and subsequently to integrate employees and downsize an organization. Finally, the system may be routinely used by an organization to identify where employee work priorities are misaligned with the organization's strategic priorities and to redesign employees' work activities accordingly.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 is a personal data page for an embodiment of the present invention;

FIG. 7 is a "create personal work profile" page for an embodiment of the present invention;

Like reference symbols in the various drawings indicate like elements.

DETAILED DESCRIPTION

Figure 1:
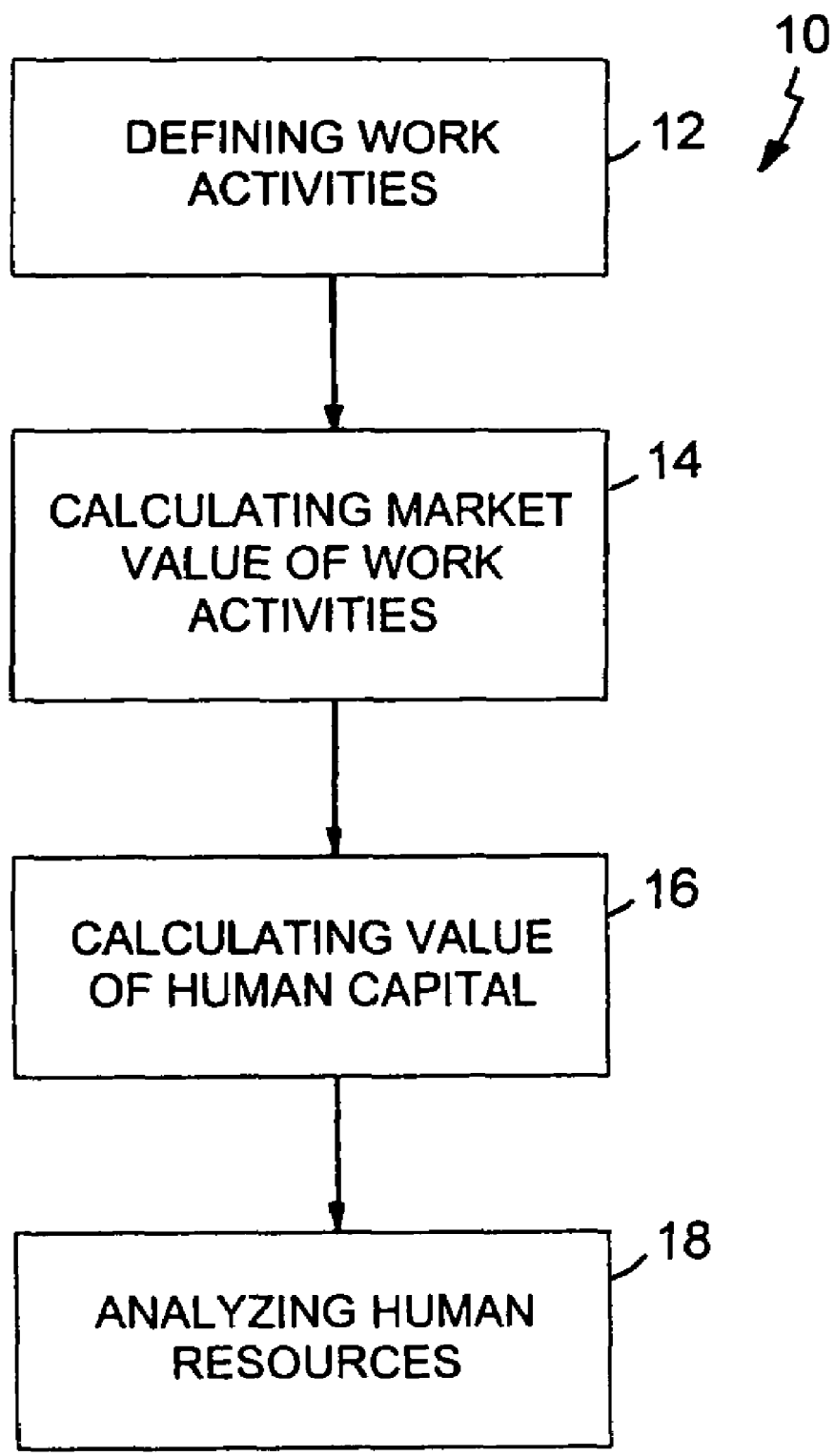
FIG. 1 is a flow diagram showing the methodology of an embodiment of the invention.

The system and method of the present invention simplifies and streamlines the process of gathering and analyzing information concerning work activities and related salary costs for improving an organization's human resource efficiency and productivity. The invention may be implemented as an application, e.g., a software program, which provides a centrally-controlled directory of predetermined and coded work activities to the organization's employees and human resource personnel and managers over an electronic network. Electronic access to the directory allows employees and managers to document work activities, produce personal work profiles, and determine the competitive market values of specific work activities.

The application allows employees to prepare profiles of the work activities or tasks which they perform during the course of their employment. The application helps an employee build a personal work profile, e.g., by allowing the employee to select a pre-existing template most similar to the employee's job. The employee may then edit the profile by adding and deleting work activities. Alternatively, the employee may build the personal work profile without a template, i.e., by searching a database of pre-defined work activities for appropriate work activities to add to the profile using key words or by scrolling through a list of work activities.

Within the employee's personal work profile, the work activities are organized by groups of related work activities or tasks. For each group of work activities, the employee specifies the percentage of time he or she spends performing work activities or tasks within that work activity group.

Based on the employee's completed personal work profile, the application automatically calculates the market value of the work performed by the employee in terms of the highest level of activities performed and the total of all work activities performed. The application may also calculate the market value of each employee's capabilities based on a manager's perceptions of how capable the employee is of performing specific work activities in the personal work profile. Aggregating the competitive market values of the capabilities of all employees in an organization provides a means of valuing the organization's human capital.

Further, the application may combine work activities data obtained from employees' personal work profiles with the organization's employee salary data to generate a variety of strategic personnel reports, e.g., for analyzing the number of employees performing various work activities and the salary costs associated with those work activities. Thus, the application may provide information concerning how much time employees are actually devoting to specific work activities, how much money the organization is spending on specific work activities in terms of salaries and payroll resources, whether the employees are underpaid or overpaid relative to the market values of their work activities or capabilities, how capable the employees are of performing their work activities, whether the employees' work activities are designed for optimum efficiency and cost effectiveness, whether an organization's employee capabilities are being utilized effectively, and the net loss or gain in human capital over a particular period.

As shown in FIG. 1, the methodology of application 10 for analyzing work activity includes defining each employee's work activities in an automated and consistent manner (step 12), automatically calculating the market value of resultant work activities for each employee (step 14), automatically calculating the value of human capital based upon the market value of employees' capabilities to perform work activities (step 16), and analyzing human resources in terms of work time allocation, salary cost, and other productivity and efficiency measures (step 18).

Figure 2:
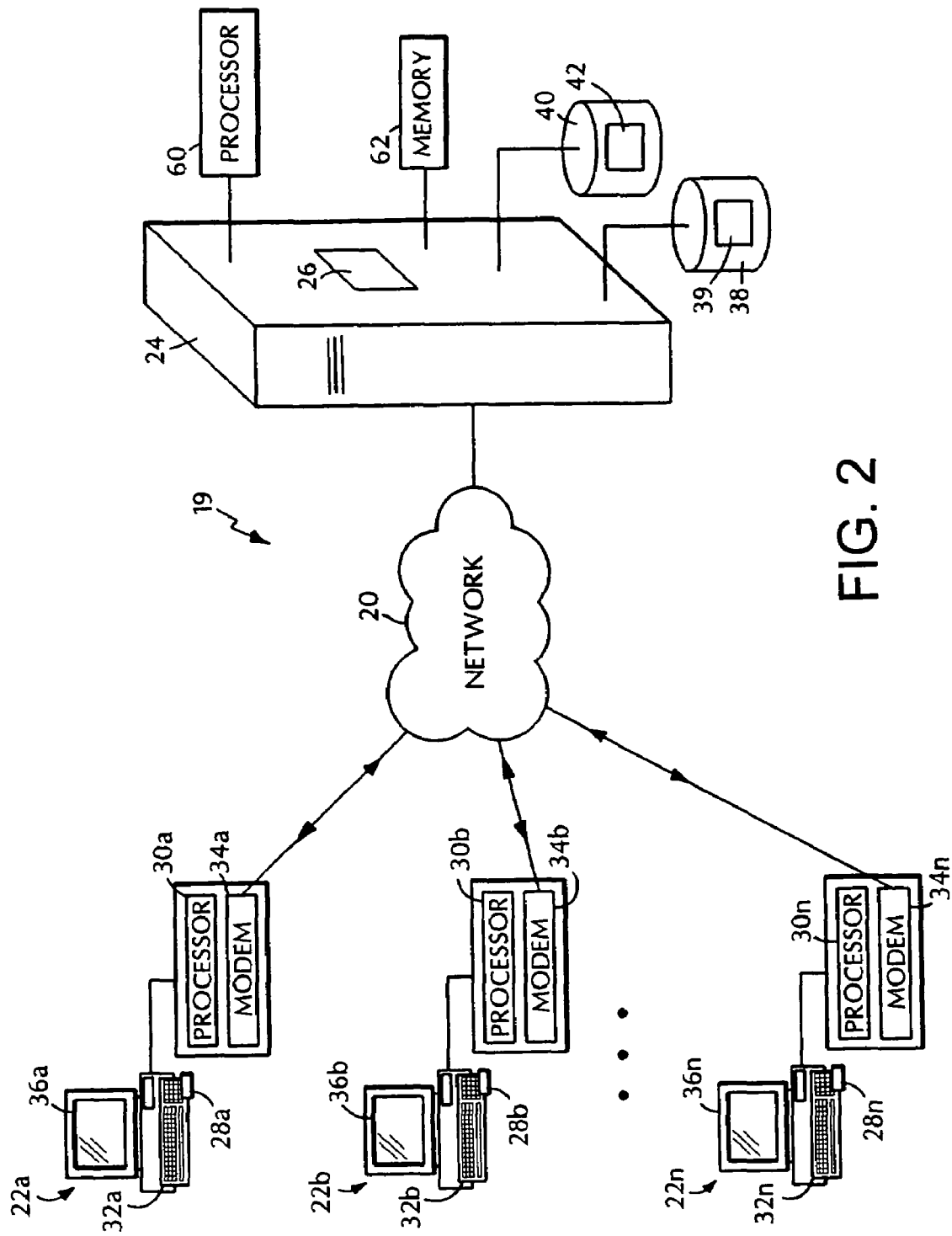
FIG. 2 is a diagrammatic sketch of a system for analyzing work activity according to the invention.

FIG. 2 shows a system 19 for analyzing work activity according to the present invention. A network 20 provides links which allow users of individual computers 22a–n to communicate with a server 24. Network 20 may be any type of network such as the Internet or a public or private internet, intranet, or dial-up electronic network. Communications over network 20 are preferably secure, e.g., using encryption techniques.

Server 24 may include a processor 60 capable of operating a software program such as application 10 and a memory 62 for storing the program. In particular, memory 62 is a computer-readable medium that stores instructions for implementing application 10, the instructions being implemented by processor 60. In a preferred embodiment, application 10 is implemented by server 24 through a web site 26 using HTTP protocol, the web site 26 generating various web pages accessible by employees of an organization over network 20 for interacting with application 10. An example of such an Internet-based work activity documentation and strategic personal analysis software application is HRDatamine™, developed by Levy & Associates, Inc., Providence, Rhode Island. HRDatamine™ uses a secure connection over the World Wide Web to collect, maintain, analyze and report information related to work activities, competitive market salaries, and employee salary costs associated with work activities.

Server 24 may also include two databases 38 and 40, which contain work activities directory 39 and job market value table 42, respectively. Work activities directory 39 includes a detailed list of numerically coded work activities. Job market value table 42 is a list of salaries corresponding to the market values of various work activities. Using work activities directory 39 and job market value table 42, application 10 links individual work activities directly to salary survey data to assign appropriate salary values to individual work activities.

Each computer 22a–n has a mouse 28a–n, a processor 30a–n, a keyboard 32a–n, a modem 34a–n or other device for communicating over network 20, and a monitor 36a–n. Mouse 28a–n, keyboard 32a–n, and monitor 36a–n function as input/output devices to allow employees operating computers 22a–n to interact with web site 26 over network 20. In particular, monitor 36a–n displays web pages associated with the web site 26 for interacting with application 10, and mouse 28a–n and keyboard 32a–n permit users to interact with the application using computer 22a–n.

Web site 26 is pre-configured with information about an organization and its employees using a data interface before the site may be accessed by the employees. For example, the data interface may include an organization's submitting data in a standard file format for its employees who will participate in application 10. Such data may include employee names, employee identification numbers, employees' job titles, employee locations, employee status, managers to whom the employees report, employee payroll identification numbers, employee salaries, employee schedules, and the status of users with respect to application 10, e.g., employee, manager or project coordinator. This data will be used in the analysis performed by application 10 and for interacting with various web pages generated on the web site 26.

Figure 3:
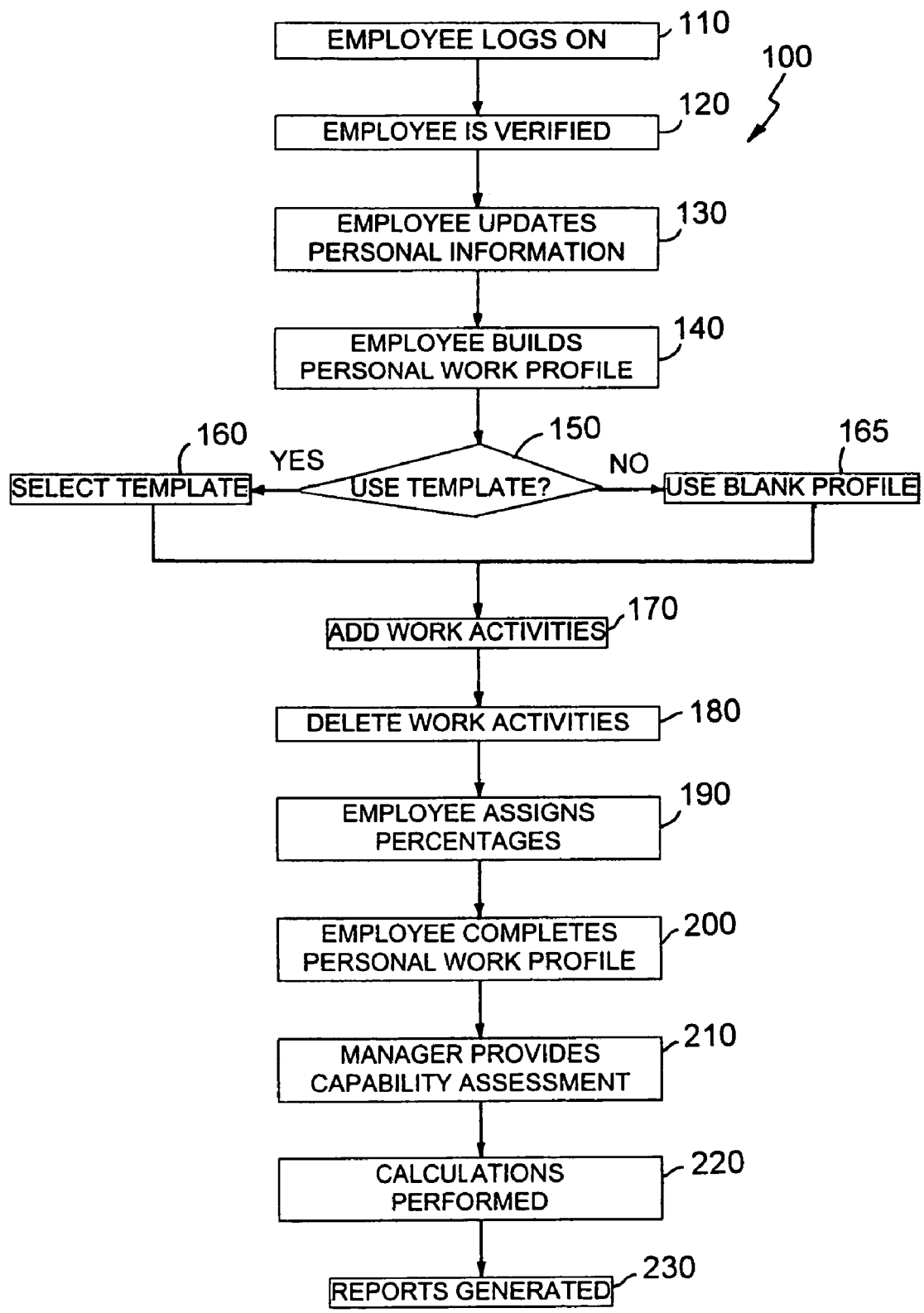
FIG. 3 is a flow diagram showing a method of collecting and analyzing work activity information according to the invention.
Figure 4:
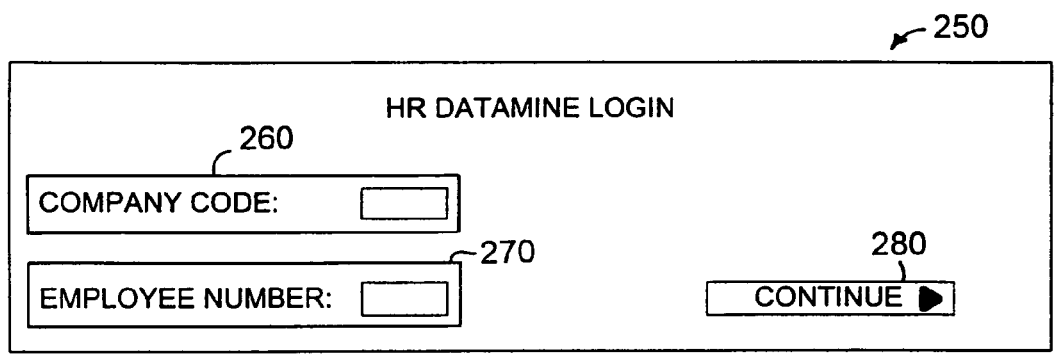
FIG. 4 is a logon page for an embodiment of the present invention.

FIG. 3 shows a method 100 for collecting and analyzing work activity information according to the present invention. The employee logs onto web site 26 (step 110). Referring also to FIG. 4, a logon page 250 provides the employee secure access to application 10. The employee is verified to access application 10 (step 120) by the employee's entering a company code 260 and a unique employee identification number 270 in the appropriate boxes to confirm the employee's identity. The employees transmits the data to application 10 by typing the requested information in the boxes and using mouse 26a–n to move a cursor across screen 36a–n to a "continue" icon or executable box 280 on the logon page and click or press a button on the mouse, i.e., using the "drag-and-click" method. Application 10 validates the employee if the company code and employee identification number match information previously input into application 10 through the data interface. If the employee is not validated, he or she may not enter into the application, and an error message is generated. A non-validated employee may then try to input correct information to confirm his or her identity or terminate the session with the web site.

Referring to FIG. 5, if the employee is validated, upon entry into application 10, the employee is presented with a personal data page 300, which shows personal data about the employee supplied by the employer through the data interface. Each item of personal information is presented in a labeled box on page 300. Some of the data may be selected from a drag-down box, e.g., status box 305, by clicking on the down-arrow associated with the box and dragging the cursor down to the item to be selected. The employee then has the opportunity to update his or her personal and work related data (step 130). The employee may be allowed to return to personal data page 300 at any time to update his or her personal information. The employee advances to the next web page by clicking on a "continue" icon 310.

Figure 6:
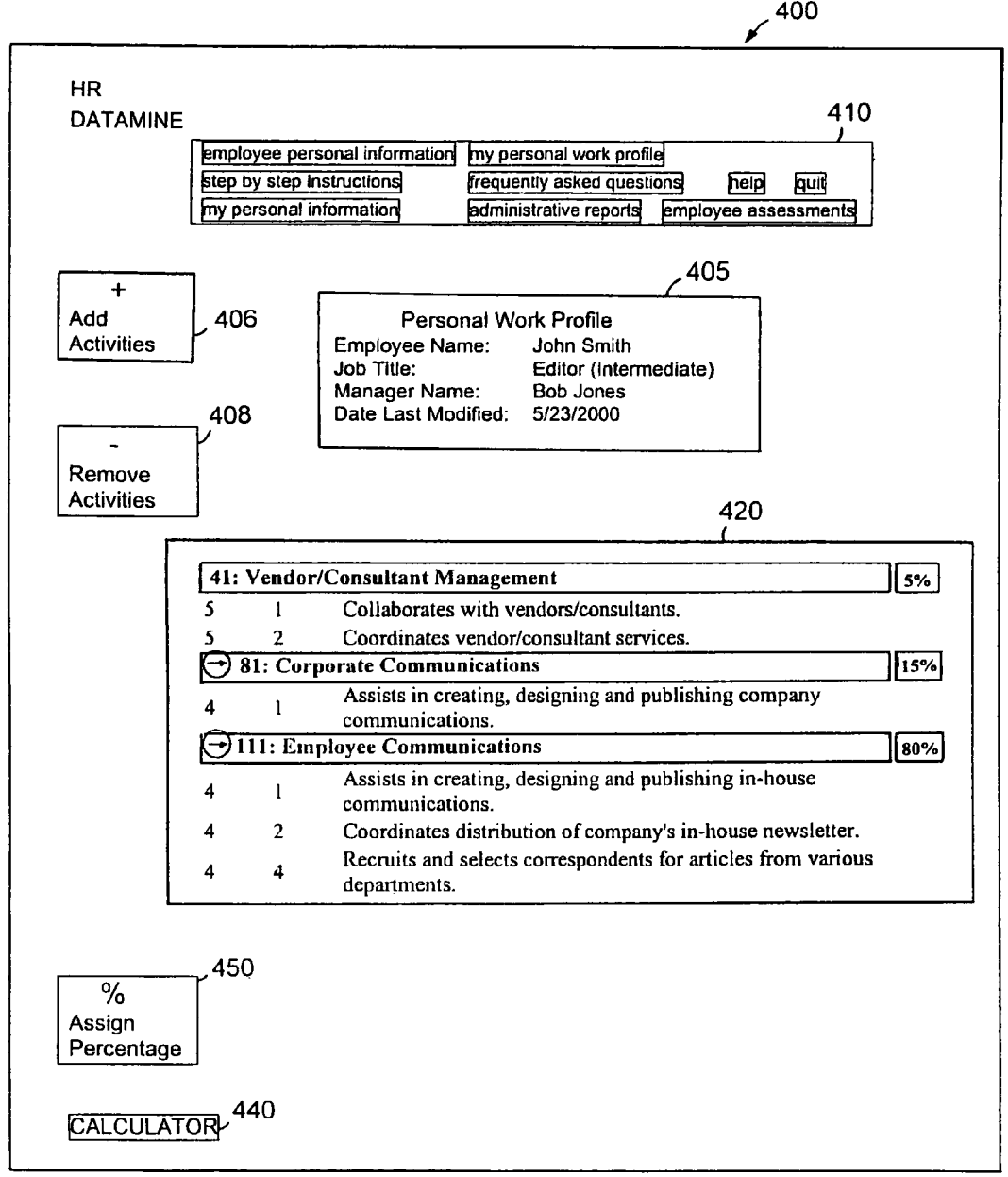
FIG. 6 is a principal web page for an embodiment of the present invention.

Referring to FIG. 6, the employee is presented with a principal web page 400. Page 400 includes a main menu 410, which allows the employee to perform functions associated with application 10 and to access various pages on the web site depending on the employee's access privileges. Main menu 410 may be a standard Windows or URL-type menu running along the top of the screen, with selections tiered into logical groupings organized by type of page and/or user access limitations. Main menu 410 may include icons or executable boxes such as "employee personal information," "my personal work profile," "step by step instructions," "frequently asked questions," "my personal information," "administrative reports," "employee assessments," "help," and "quit." The functions or pages associated with each of the icons may be executed or accessed, e.g., using the drag-and-click method.

Page 400 also includes a personal work profile 420 for the employee indicated in identification box 405. Personal work profile 420 is a list of all of the work activities an employee performs, grouped by work functions. Work functions may include, e.g., auditing, business development, compliance, customers/clients, external affairs, finance, general administrative and clerical, general services, general supervisory and managerial, human resources, information technology, legal, marketing, outsourced services, strategic planning, and treasury.

As shown in FIG. 3, the employee builds personal work profile 420 (step 140). The employee builds a personal work profile in one of two ways. The employee determines whether there is an appropriate pre-written personal work template (step 150), which has been stored in memory 62, and either selects such a template (step 160) or uses a blank profile (step 165) without the aid of a template. The employee may edit the selected template or a blank profile by adding work activities (step 170) and deleting work activities (step 180). Referring to FIG. 7, if the employee has not yet created a personal work profile, he or she will be presented with the "create personal work profile" page 500. Application 10 encourages employees to begin building their personal work profile by first searching a database of pre-written templates for various jobs. The employee accesses the templates by clicking on a "show me the templates" icon 510. Alternatively, the employee may select a blank template by clicking on an "I'll create my personal profile from scratch" icon 520.

Templates include a list of work activities for a given job title. To expedite the search process, each template is assigned a generic job title, and the employee identifies a job title from the template list that most closely relates to his own job title. Templates corresponding to job titles are categorized by key job categories, e.g., administration, finance, general services, human resources, information technology, legal, marketing/sales/public relations, and production/distribution/professional services. The employee may examine as many templates as he or she wishes to attempt to find the most appropriate template. Upon identifying an applicable template, the employee selects it for his or her personal work profile.

Page 400 allows the employee to create his or her personal work profile using either the selected template or a blank profile. The employee adds and deletes work activities based on the list of work activities in directory of work activities 39. To add or subtract work activities, the employee clicks on icons 406 and 408, respectively, on page 400 using the drag-and-click method.

Figure 8:
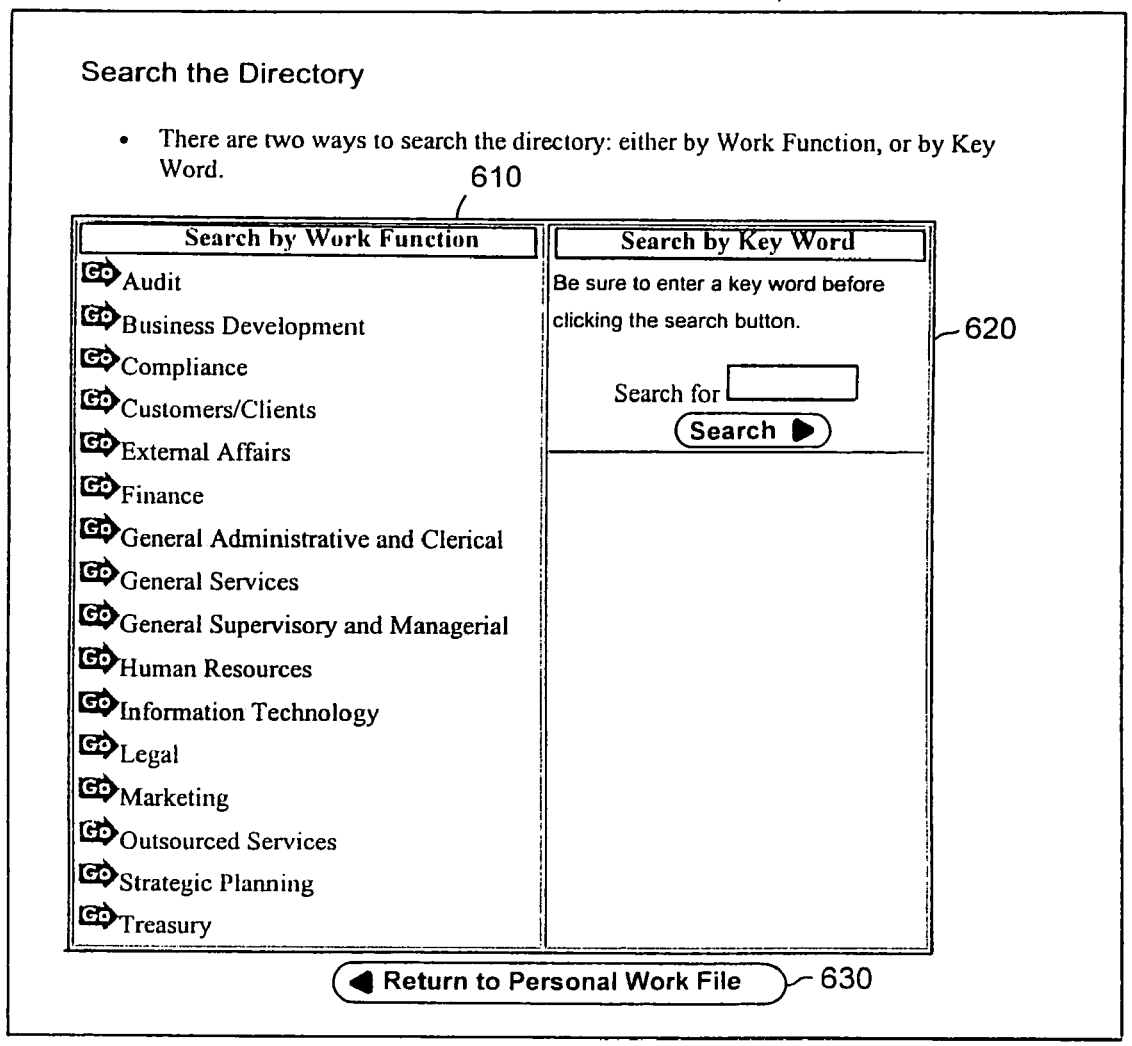
FIG. 8 is a page for searching directories in an embodiment of the present invention.

As shown in FIG. 8, the employee may search the work activities directory 39 for applicable work activities. From a page 600, the employee may perform an electronic search by function category, by work task group, or by key word using a pick list 610 or by entering a key word in a search engine 620. Pick list 610 allows the employee to search the work activities directory 39 by first clicking on a work function in a list of work functions. The employee selects an applicable work activity group by pointing and clicking on a list associated with the selected work function. Finally, upon selecting a work activity group, the employee again points and clicks to choose individual work activities associated with the selected work activity group to add to his or her personal work profile. Pick list 610 also sorts work activities by organization levels, e.g. entry, intermediate, and senior levels. Alternatively, the employee may search for relevant work activities by entering a key word or words into a search engine 620. Then, the employee selects appropriate work activities from the search results generated by the search engine to add to his or her personal work profile. Whether using the pick list or searching by key word, an employee simply points and clicks on applicable work activities, and application 10 automatically adds the work activities to the employee's personal work profile. Inapplicable work tasks are deleted using the same point-and-click method. Clicking on a "return to personal work profile" icon 630 allows the employee to return to personal work profile 420 on page 400.

Once the employee has selected all applicable work activities, the employee assigns a percentage of his or her time to each work activity group (step 190) by clicking on "assign percentage" icon 450. Application 10 provides an interactive calculator 440 to assist the employee in making accurate estimates of the percentages of time he or devotes to each work activity group. The calculator converts any requested time period, e.g., 2 days per workweek, into an equivalent percentage of time that the employee may then enter into application 10. The percentages for each work activity group appear in personal work profile 420. An automatic calculation takes place prior to employee's completing personal work profile to ensure that the employee has accounted for 100% of his or her time. The employee then completes his or her personal work profile by clicking on the "quit" icon (step 200), and the personal work profile is saved in memory 62.

Each user of application 10 is assigned a status type through the data interface. For example, a user may have the status of employee, manager, project coordinator, or "super user" that manages the application. Each status, respectively, provides greater access to features of application 10. A user's type, as entered with the user interface, is automatically associated with his or her login personal information profile. In particular, application 10 permits an employee's immediate manager or supervisor to access the employee's personal work profile in order to edit the employee's work activities and to rate the employee's capability for performing each work activity. Application 10 independently values the manager's personal capabilities ratings of employees to calculate the market value of the employees' capabilities.

Figure 9:
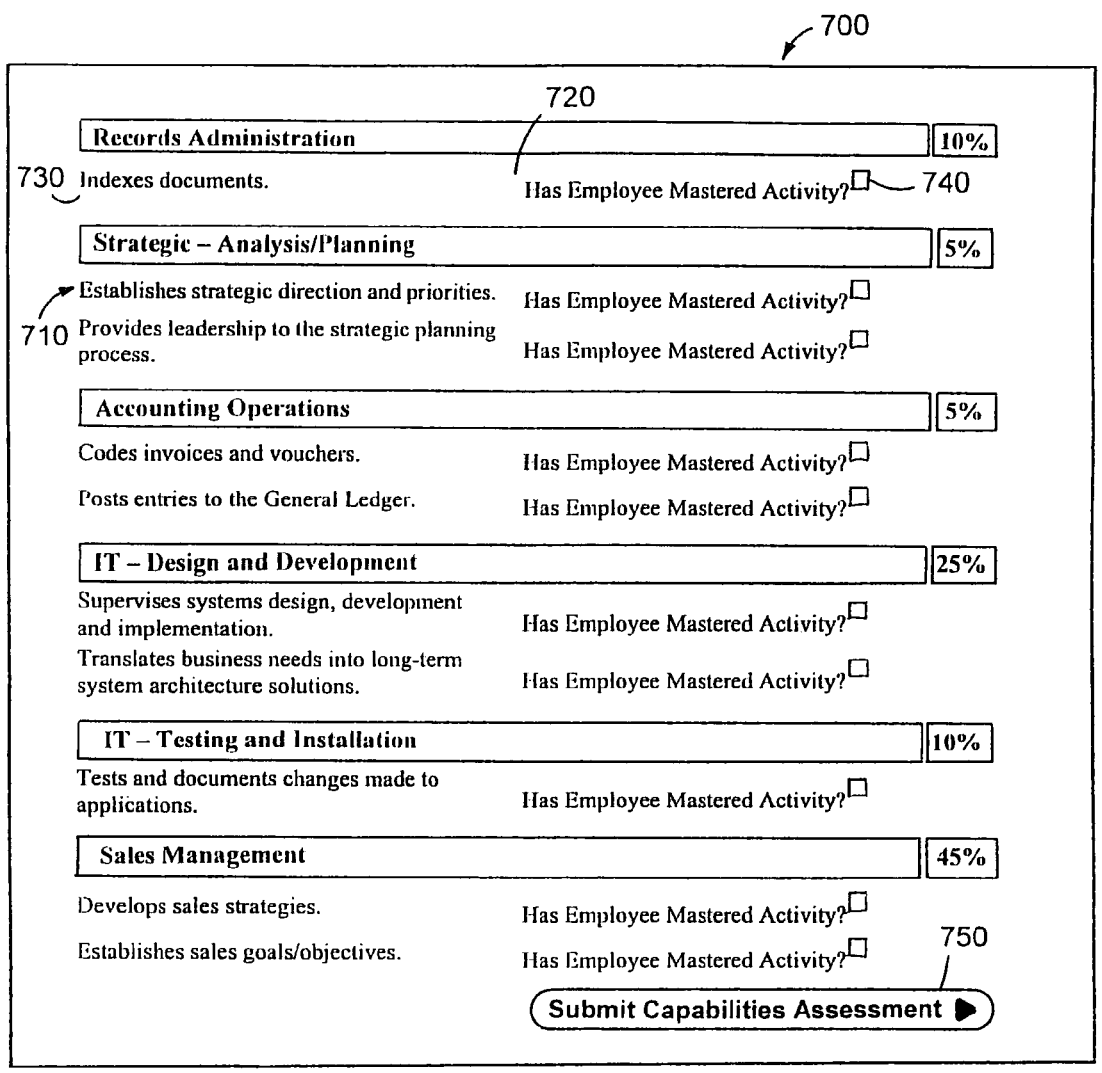
FIG. 9 is a page for assessing employees' personal work profiles for an embodiment of the present invention.

A manager may provide an employee capability assessment by evaluating each of his employee's ability to perform the work activities included on the employee's personal work profile (step 210). Referring to FIG. 9, the manager completes an employee assessment questionnaire 710 generated on a page 700 by answering a question 720 that appears at the end of each work activity 730. The manager marks a box 740 adjacent to the work activity 730 if the manager believes that the employee has fully mastered the work activity. The manager may leave the box 740 blank if he or she believes that the employee has not yet fully mastered the work activity. After completing the evaluation of the employee's capabilities, the manager clicks on the "submit employee assessment" icon 750. Each manager should enter a separate assessment for each employee reporting to him or her, and then click on the "quit" icon when finished.

A manager may also review an employee's personal work profile by clicking on the "employee work profiles and capabilities assessment" icon at the top of page 400, clicking on the "search" icon, and selecting the employee from the generated list. The manager may then edit the employee's personal work profile using icons including "add activities," "remove activities," "assign percentage," and "duplicate profile." The "duplicate profile" option allows the manager to duplicate the profile of one employee for another employee.

Application 10 automatically calculates the market value of the work activities for each employee based on the employee's personal work profile (step 220). As explained in more detail below, application 10 accomplishes this calculation by correlating work activities, percentages of time allocated to each activity, and salary rates. Application 10 then applies various algorithms to determine separate values for the employee's personal work profile, including the value of the highest level of work activities performed by the employee and the value of all work activities performed by the employee.

Application 10 may access the completed and assessed personal work profiles stored in memory 62, which may include each employee's work activities, time spent on each work activity, salary costs, personal work profile values, and capabilities values. Application 10 may then generate a variety of strategic reports, salary cost analyses, and trend analyses. Custom analyses may also be generated.

A project coordinator may access various administrative reports at any time during the course of the project. These reports provide up-to-the-minute status of the progress of employees and managers in completing their responses and entries to application 10. The project coordinator first clicks on the "administrative reports" icon in main menu 410. Clicking on an "all employees in project" icon generates a report listing all employees currently included in the project. Clicking on a "missing or incomplete personal work profiles" icon provides a report listing any employees who do not have a completed personal work profile or who have incorrect percentages of time assigned to their work activities. Clicking on a "missing employee capability assessments" icon provides a report listing any managers and their employees for whom an employee capabilities assessment has not yet been completed. A project coordinator can use these reports to identify employees and managers to be contacted to complete application 10.

Figure 10:
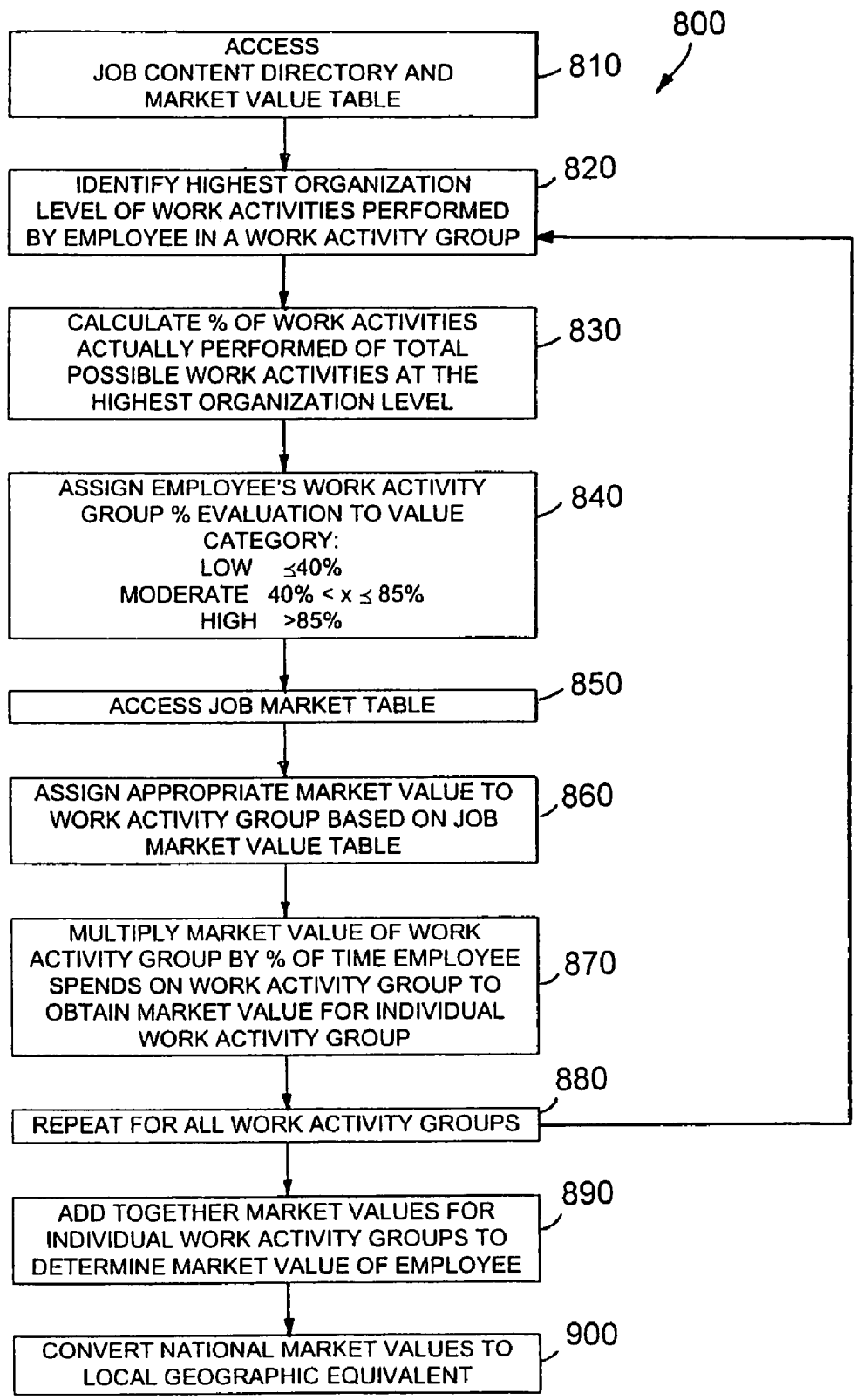
FIG. 10 is a flow chart of an algorithm for determining the value associated with an employee's personal work profile.

FIG. 10 shows a method 800 for determining the value associated with an employee's personal work profile. First, data from the employee's personal work profile is provided and the databases, including job content directory 39 and job market value table 42, are accessed (step 810). All work activities in directory 39 are assigned specific identifying codes based on the sort criteria, including key category (e.g., combination of various functions), function (e.g., human resources, finance, information technology), work activity group (e.g., employee benefits, budgeting, programming), and work activity (i.e., statement describing a work task). Within each work activity group, work activities are grouped by organization level. An organization level may be a value, e.g., 1–8, assigned to each of an organization's administrative levels. Moreover, each work activity at each organization level may be associated with a plurality of market levels corresponding, e.g., to the 25th, 50th, and 75th percentile of the market value for the particular work activity. The organization using application 10 determines in advance whether it wishes to place itself at the 25th, 50th, or 75th percentile of the market in terms of salary valuation. Job market value table 42 includes a separate job market value for each work activity group, organization level and market level. Job market values of each work activity group are based on the work activities included at each organization level and competitive salary rates. Competitive market values are researched and compiled from published salary surveys and other sources to create job market value table 42.

Each of the components of the employee's job is "priced," i.e., by "job parts pricing". For salary valuing purposes, each work activity group included on an employee's personal work profile is treated as a separate "job part." In a first algorithm, for each work activity group, application 10 identifies the highest organization level of work activities performed by the employee (step 820). The application calculates the percentage of the work activities actually performed out of the total possible work activities at the highest organization level (step 830). For example, if the highest level of work activities performed by an employee for a given work activity group is organization level 8, organization level 8 contains 10 possible work activities, and the employee performs 5 out the possible 10 work activities, the employee performs 50% of the possible work activities for the work activity group at organization level 8.

Application 10 assigns the employee's work activity group evaluation or "job part," to one of three value categories based on the percentage of possible work activities performed by the employee (step 840). The three value categories are "low," i.e., equal to or less than 40% of possible work activities, "moderate," i.e., greater than 40% but less than or equal to 85% of possible work activities, and "high," i.e., greater than 85% of possible work activities.

Application 10 accesses job market value table 42 (step 850). Job market value table 42 has three values for each work activity group corresponding to the value categories low, moderate, and high. Application 10 assigns the appropriate market value, based on the organization's choice to be at the 25th, 50th or 75th percentile of the market, to the work activity group based on the job market value table (step 860).

Finally, application 10 multiplies the applicable market value by the percentage of time reflected on the employee's personal work profile for that work activity group (step 870), thus calculating the market value for the individual work activity group or job part.

This process is repeated for each work activity group until all of an employee's job parts are valued (step 880). Application 10 then aggregates the values of all work activity groups to determine the overall market value of the employee's personal work profile (step 890). Application 10 may also convert the national market values to the local geographic equivalent based on the employee's work location (step 900). In order to compensate for local geographic differences, application 10 applies a local geographic multiplier and dollar offset to the national market values. The multipliers and offsets are derived from published geographic differential surveys and reside in memory 62.

Figure 11:
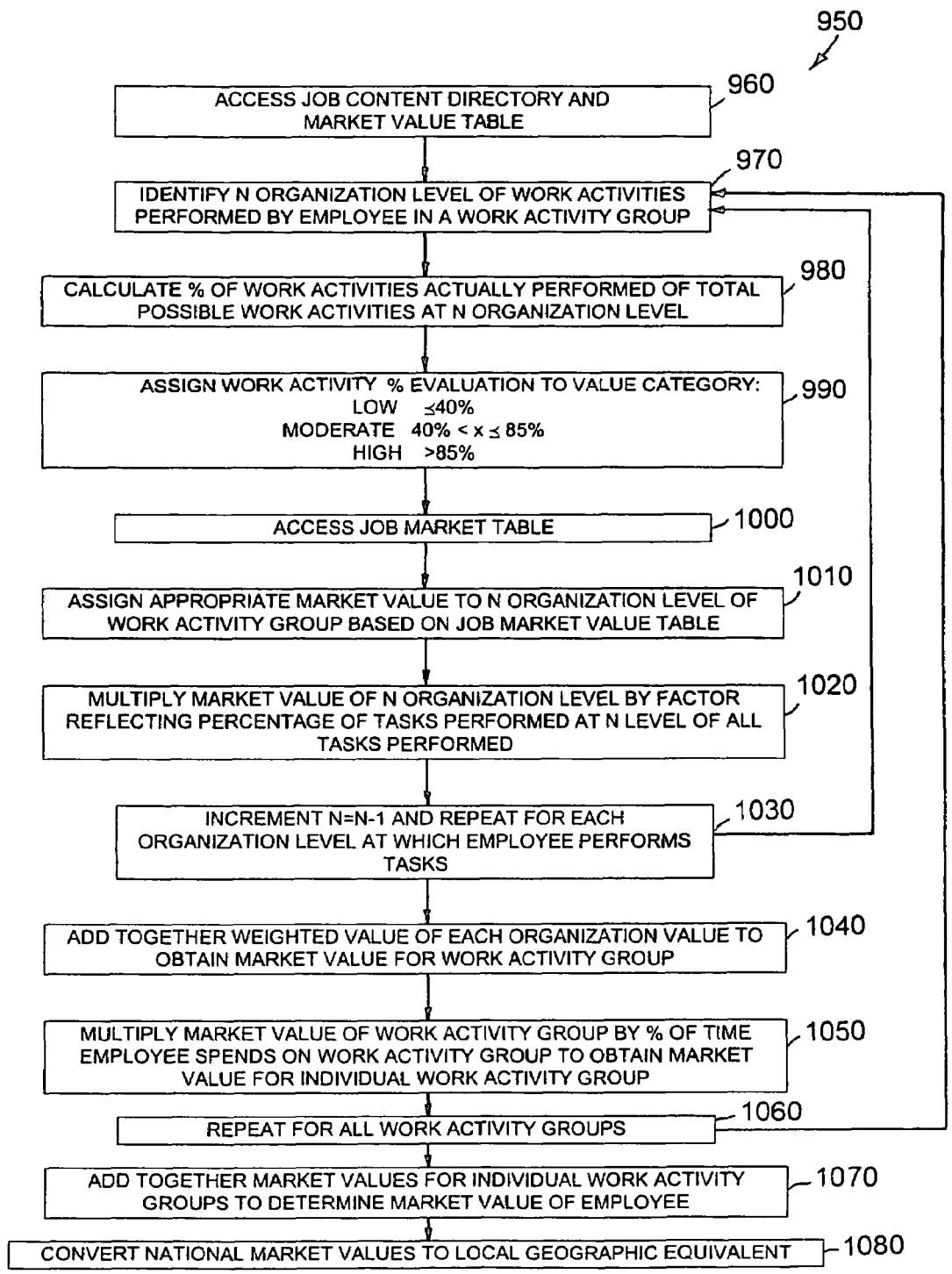
FIG. 11 is a flow chart of another algorithm for determining the value associated with an employee's personal work profile.

As illustrated in FIG. 11, in a second algorithm 950, instead of identifying only the highest organization level of work activities performed by the employee in a work activity group, application 10 considers all organization levels of work activities in each work activity group in an employee personal work profile. First, data from the employee's personal work profile is provided and the databases, including job content directory 39 and job market value table 42, are accessed (step 960). Then, application 10 identifies an organization level "n" of work activities performed by the employee (step 970). For the first iteration, "n" is the highest organization level of tasks performed by the employee.

For each work activity group in the personal work profile, application 10 calculates the percentage of work activities actually performed out of the total possible work activities at each organization level at which an employee performs work activities (step 980). For example, if the highest level of work activities performed by an employee for a given work activity group is organization level 8, organization level 8 contains 10 possible work activities, and employee performs 5 out the possible 10 work activities, then the employee performs 50% of the possible work activities for the work activity group at organization level 8. If the employee also performs work activities at organization level 7, organization level 7 contains 5 possible work activities, and the employee performs 3 out of the possible 5 work activities, then the employee performs 60% of the possible work activities for the work activity group at organization level 7. In this case, application 10 assigns each of the employee's work activity group evaluations or "job parts" for each organization level to one of the three value categories low, moderate and high (step 990). Application 10 then accesses job market value table 42 (step 1000), and assigns the appropriate job market value to each organization level in the work activity group based on the job market value table (step 1010). The market value for each organization level is then weighted or multiplied by a scaling factor to reflect the number of tasks performed at each level out of the total number of tasks performed in the work activity group (1020). In the example above, the market value for organization level 8 would be multiplied by ⅝ and the market value for organization level 7 would be multiplied by ⅜-Application 10 repeats this process to calculate market values for each organizational level within a work activity group (step 1030). Application 10 adds the weighted market values for each organization level to obtain a total market value for the work activity group (step 1040). Finally, application 10 multiplies the sum of weighted market values by the percentage of time reflected on the employee's personal work profile for the individual work activity group, thus calculating the market value for the individual work activity group, or job part (step 1050). This process is repeated for each work activity group until all of an employee's job parts are valued (step 1060). Application 10 aggregates the values of all work activity groups to determine the overall market value of the employee's personal work profile (step 1070). Application 10 converts the national market values to the local geographic equivalent based on the employee's work location (step 1080).

Once an organization's employees have completed and entered their personal work profiles, various statistical information and strategic reports may be compiled by application 10. The reports may provide strategic business information both through the use of built-in standardized reports and through an ad hoc query mechanism such as an on-line analytical processing tool. Application 10 stores select employee data and other data input from an organization, e.g., obtained from the organizations human resources information system or payroll system. This data may include employee names, job titles and job codes, departments, locations, and salaries. Application 10 integrates these data to configure a variety of strategic personnel reports. For example, strategic personnel reports display analyses of costs, i.e., salary dollars and numbers of employees, attributed to specific work activities performed throughout the organization.

Preferably, only authorized users of application 10, e.g., an organization's human resources personnel, may access strategic reports. The strategic reports may be produced as graphs or hard-copy printouts. Reports may also be prepared in Excel spreadsheet format and stored electronically.

Application 10 may be used to prepare various types of strategic reports based on the work activity data obtained from an organization's employees. For example, a work cost report compiles payroll cost per work activity, full-time equivalencies per work activity, and payroll cost and employee time allocation per strategic function. Work maps show work units and organizational levels per work activity and duplication or redundancies of work activities among jobs or employees. A report on the value of human capital includes market value of employees' capabilities to perform work activities, market value of work activities, actual salary cost of work activities, and salary competitiveness per work activity as under or over the market rate. "Brain drain" analysis summarizes the market value of lost capabilities resulting from employee turnover, as well as functions or work units experiencing such brain drain. A calculation of future performance indices illustrates the unit payroll cost of productivity. A report of future benchmarking lists industry norms and comparisons. An analysis of customer satisfaction and complaints correlates customer data with employees' capabilities and salary competitiveness.

A number of embodiments of the invention have been described. Nevertheless, it will be understood that various modifications may be made without departing from the spirit and scope of the invention. Accordingly, other embodiments are within the scope of the following claims.

What is claimed is:

1. A system for obtaining information about the work activities of an employee, comprising:
   a server for providing a site through which the employee creates a profile of the work activities of the employee selected from a directory of work activities, each work activity in the directory being classified by work activity group and further defined by organizational level within each work activity group; and
   a computer capable of accessing the site over a network, the employee using the computer to create the profile of the work activities of the employee and transmit the information about the work activities of the employee to the server;
   wherein the server calculates a market value valuation for the profile of the work activities of the employee including by correlating the work activities of the employee into work activity groups, and correlating the organizational levels of the work activities performed within each work activity group, the number of work activities performed at each organizational level within each work activity group, the percentages of time allocated to the aggregate work activities within each work activity group and external market rates of the work activities within each work activity group of the employee, percentages of time allocated to the work activities of the employee, and salary rates.

2. The system according to claim 1 wherein the server is capable of performing an analysis of the work activities of the employee based on the profile of the work activities of the employee and the calculated market value valuation.

3. The system according to claim 2 wherein the server is capable of generating a report based on the analysis.

4. The system according to claim 1 wherein the network is a network known as the Internet.

5. The system according to claim 1 further comprising a first database including work activity values for work activities of the employee in the profile.

6. The system according to claim 1 further comprising a second database including a directory of work activities used to create the profile.

7. The system according to claim 1 wherein the profile contains a plurality of groups of work activities.

8. The system according to claim 7 wherein the employee assigns a percentage of the employee's time to each group of work activities in the profile.

9. The system according to claim 8 wherein a work activities group value is calculated for each group of work activities.

10. The system according to claim 9 wherein the work activities group values for the groups of work activities are weighted to calculate the market value valuation for the profile.

11. A system for obtaining information about the work activities of a plurality of employees, comprising:
    a server for providing a site through which each of the plurality of employees creates a profile of the work activities of the employee selected from a directory of work activities, each work activity in the directory being classified by work activity group and further defined by organizational level within each work activity group; and
    at least one computer capable of accessing the site over a network, each of the plurality of employees using the computer to create the profile of the work activities of the employee and transmit information about the work activities of the employee to the server;
    wherein the server calculates market values valuations for the profiles of the work activities of the plurality of employees including by correlating the work activities of the employee into work activity groups, and correlating the organizational level of the work activities performed within each work activity group, the number of work activities performed at each organizational level within each work activity group, the percentages of time allocated to the aggregate work activities within each work activity group and external market rates of the work activities within each work activity group of the employees, percentages of time allocated to the work activities of the employees, and salary rates.

12. A method of obtaining information about the work activities of an employee, comprising:
    providing a site accessible to the employee over a network;
    creating a profile of the work activities of the employee at the site, where the work activities are selected from a directory of work activities, each work activity in the directory being classified by work activity group and further defined by organizational level within each work activity group; and
    calculating a market value valuation for the profile of the work activities of the employee including by correlating the work activities of the employee into work activity groups, and correlating the organizational level of the work activities performed within each work activity group, the number of work activities performed at each organizational level within each work activity group, the percentages of time allocated to the aggregate work activities within each work activity group and external market rates of the work activities within each work activity group of the employee, percentages of time allocated to the work activities of the employee, and salary rates.

13. The method of claim 12 further comprising
    generating a report based on the work activities of the employee in the profile and the calculated market value valuation for the profile.

14. The method of claim 12 further comprising
    adding work activities of the employee to the profile.

15. The method of claim 12 further comprising
    deleting work activities of the employee from the profile.

16. The method of claim 12 further comprising
    providing a template for the employee to create the profile.

17. The method of claim 12 further comprising
    converting the market value valuation for the profile to a local geographic equivalent value.

18. The method of claim 12 further comprising
    assessing a capability of the employee with respect to the work activities in the profile.

19. The method of claim 12 further comprising
    assigning a percentage of the employee's time to the work activities in the profile.

20. The method of claim 12 further comprising
    weighting the working activities of the employee in the profile to calculate the market value valuation for the profile.

21. A method of obtaining information about the work activities of an employee, comprising:
    providing a site accessible to the employee over a network;
    creating a profile of the work activities of the employee at the site, wherein the work activities are selected from a directory of work activities, each work activity in the directory being classified by work activity group and further defined by organizational level within each work activity group; and
    analyzing the profile of the work activities of the employee including by correlating the work activities of the employee into work activity groups, and correlating the organizational level of the work activities performed within each work activity group, the number of work activities performed at each organizational level within each work activity group, the percentages of time allocated to the aggregate work activities within each work activity group and external market rates of the work activities within each work activity group of the employee, percentages of time allocated to the work activities of the employee, and salary rates.

22. The method of claim 21 further comprising
    generating a repot based on the work activities of the employee in the profile.

23. The method of claim 21 further comprising
    adding work activities of the employee to the profile.

24. The method of claim 21 further comprising
    deleting work activities of the employee from the profile.

25. The method of claim 21 further comprising
providing a template for the employee to create the profile.

26. The method of claim 21 further comprising
assessing a capability of the employee with respect to the work activities in the profile.

27. The method of claim 21 further comprising
assigning a percentage of the employee's time to the work activities in the profile.

28. An apparatus comprising a computer-readable medium that stores instructions for implementing an application to obtain information about the work activities of an employee, the instructions for causing a computer to:
provide a site accessible to the employee over a network;
create a profile of the work activities of the employee at the site, wherein the work activities are selected from a directory of work activities, each work activity in the directory being classified by work activity group and further defined by organizational level within each work activity group; and
calculate a market value valuation for the profile of the work activities of the employee including by correlating the work activities of the employee into work activity groups, and correlating the organizational level of the work activities performed within each work activity group, the number of work activities performed at each organizational level within each work activity group, the percentages of time allocated to the aggregate work activities within each work activity group and external market rates of the work activities within each work activity group of the employee, percentages of time allocated to the work activities of the employee, and salary rates.

29. The apparatus of claim 28, further comprising instructions for causing a computer to
generate a report based on the work activities of the employee in the profile and the calculated market value valuation for the profile.

30. A system for implementing an application to obtain information about the work activities of an employee, comprising:
a memory which stores computer instructions; and
a processor that executes the computer instructions to:
provide a site accessible to the employee over a network;
create a profile of the work activities of the employee at the site, wherein the work activities are selected from a directory of work activities, each work activity in the directory being classified by work activity group and further defined by organizational level within each work activity group; and
calculate a market value valuation for the profile of the work activities of the employee including by correlating the work activities of the employee into work activity groups, and correlating the organizational level of the work activities performed within each work activity group, the number of work activities performed at each organizational level within each work activity group, the percentages of time allocated to the aggregate work activities within each work activity group and external market rates of the work activities within each work activity group of the employee, percentages of time allocated to the work activities of the employee, and salary rates.

31. The system of claim 30, further comprising instructions to generate a report based on the work activities of the employee in the profile and the calculated market value valuation for the profile.

32. An apparatus comprising a computer-readable medium that stores instructions for implementing an application to obtain information about the work activities of an employee, the instructions for causing a computer to:
provide a site accessible to the employee over a network;
create a profile of the work activities of the employee at the site, wherein the work activities are selected from a directory of work activities, each work activity in the directory being classified by work activity group and further defined by organizational level within each work activity group; and
analyze the profile of the work activities of the employee including by correlating the work activities of the employee into work activity groups, and correlating the organizational level of the work activities performed within each work activity group, the number of work activities performed at each organizational level within each work activity group, the percentages of time allocated to the aggregate work activities within each work activity group and external market rates of the work activities within each work activity group of the employee, percentages of time allocated to the work activities of the employee, and salary rates.

33. The apparatus of claim 32, further comprising instructions for causing a computer to
generate a report based on the work activities of the employee in the profile.

34. A system for implementing an application to obtain information about the work activities of an employee, comprising:
a memory which stores computer instructions; and
a processor that executes the computer instructions to:
provide a site accessible to the employee over a network;
create a profile of the work activities of the employee at the site, wherein the work activities are selected from a directory of work activities, each work activity in the directory being classified by work activity group and further defined by organizational level within each work activity group; and
analyze the profile of the work activities of the employee including by correlating the work activities of the employee into work activity groups, and correlating the organizational level of the work activities performed within each work activity group, the number of work activities performed at each organizational level within each work activity group, the percentages of time allocated to the aggregate work activities within each work activity group and external market rates of the work activities within each work activity group of the employee, percentages of time allocated to the work activities of the employee, and salary rates.

35. The system of claim 34, further comprising instructions to generate a report based on the work activities of the employee in the profile.

* * * * *